W. I. TWOMBLY.
MEANS TO DRIVE FANS OF MOTOR VEHICLES.
APPLICATION FILED FEB. 10, 1911.

1,039,223.

Patented Sept. 24, 1912.

WITNESSES:
Howard C. Thompson
G. Philipp

INVENTOR
Willard Irving Twombly,
BY John O. Seifert.
ATTORNEY

UNITED STATES PATENT OFFICE.

WILLARD IRVING TWOMBLY, OF NEW YORK, N. Y., ASSIGNOR TO TWOMBLY MOTORS COMPANY, OF NEW YORK, N. Y., A CORPORATION OF NEW YORK.

MEANS TO DRIVE FANS OF MOTOR-VEHICLES.

1,039,223.   Specification of Letters Patent.   Patented Sept. 24, 1912.

Application filed February 10, 1911. Serial No. 607,738.

*To all whom it may concern:*

Be it known that I, WILLARD IRVING TWOMBLY, a citizen of the United States, residing in the borough of Manhattan, in the city, county, and State of New York, have invented new and useful Improvements in Means to Drive Fans of Motor-Vehicles, of which the following is a specification.

This invention relates to motor vehicles in which the motor is adapted to be quickly placed in position in and removed from the vehicle frame from the front thereof, and is cooled by means of water circulating through a suitable jacket around the motor and cooled by passing through a suitable cooler, such as a cellular radiator, a rotary fan drawing a current of air through the cells of the cooler to materially aid in the cooling of the water, and it is the object of the invention to provide an improved method of and means to drive the fan.

In carrying out my invention I rotatively mount the fan with the axis of its shaft parallel with the axis of the motor, and mount on said shaft a drive wheel to rotate therewith and have sliding movement thereon, and with which the fly wheel of the motor is thrown into frictional engagement to operatively couple said wheels as the motor is placed in the frame, whereby to drive the wheel and fan from the drive wheel of the motor, means being provided whereby to maintain the wheel in frictional contact with said fly-wheel.

Figure 1:
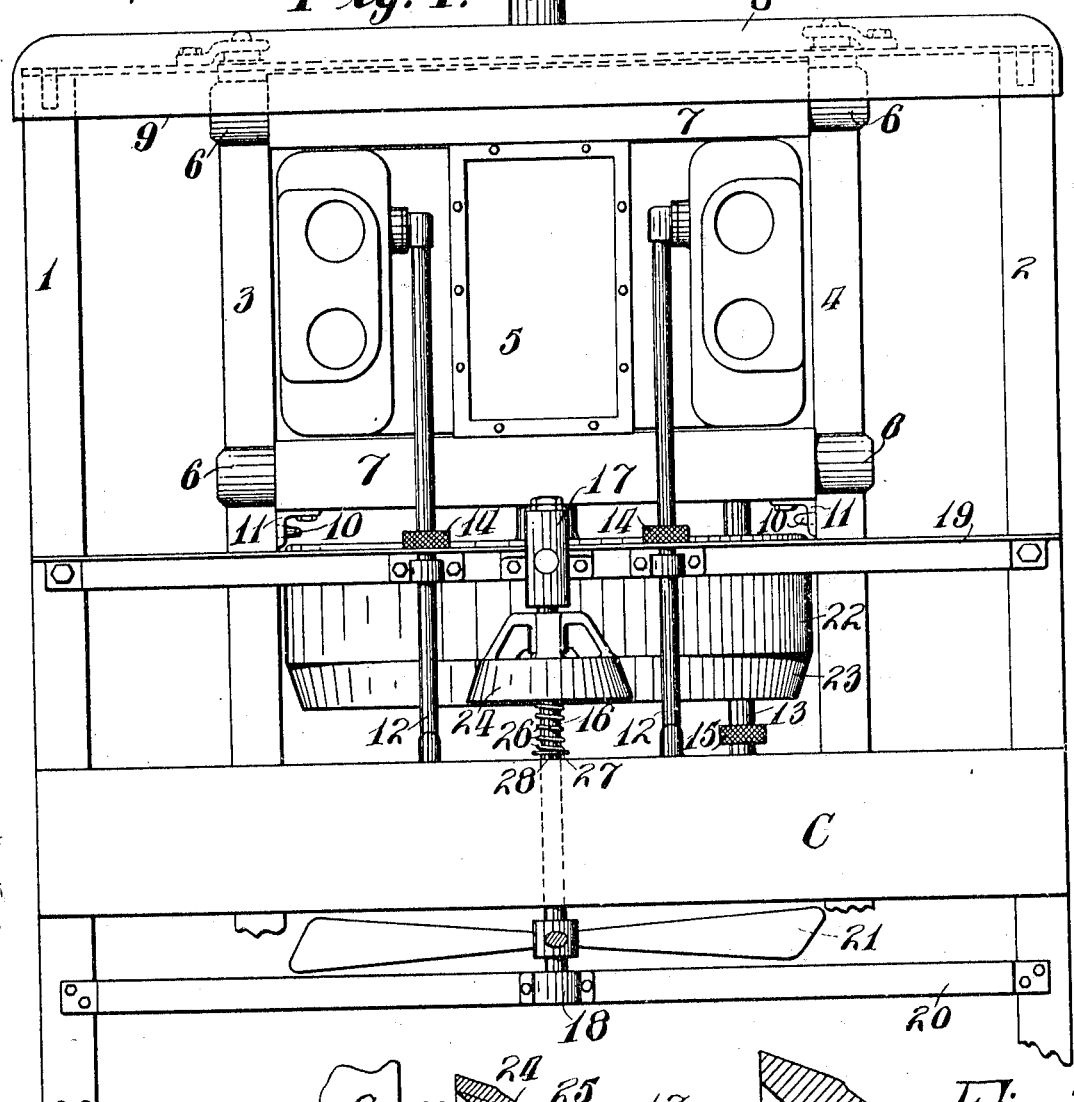
Figure 2:
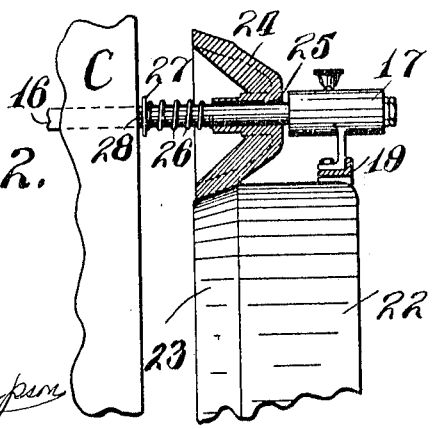
Figure 3:
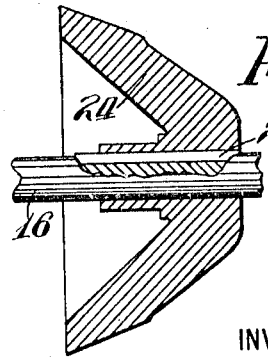

In the drawings accompanying and forming a part of this specification, Figure 1 is a plan view of the forward end of the frame of a motor vehicle chassis with a motor mounted therein illustrating my improved method of and means to drive the fan. Fig. 2 is a detail side elevation, partly in section, to illustrate the relation of the fan drive-wheel to the fly-wheel; and Fig. 3 is an enlarged sectional side elevation of the fan-drive wheel, and the manner of mounting the same on the fan-shaft.

Similar characters of reference designate like parts throughout the different views of the drawings.

In the present instance I have shown my improved fan drive in connection with a motor mounted in the frame of the chassis of a motor vehicle, the said frame comprising a pair of parallel side bars 1, 2 connected in any suitable manner. A supplemental motor carrying frame, in the form of a pair of tracks 3, 4 parallel with the side bars 1, 2 is fixed to the frame. The motor 5 is supported on said supplemental frame by means of rollers or wheels 6 rotatively mounted on the end of hanger arms 7 projecting laterally from the frame of the motor, the said rollers permitting of the rolling of the motor into and out of the chassis frame from the front thereof. The motor is retained in the frame by a bar 8 extending transversely of and releasably connected to the frame bars, the said bar having a flange portion 9 to engage over the forward part of the motor frame to hold the latter firmly on the supplemental frame. Pins 10 on the tracks 3, 4 engage in slots in lugs 11 fixed to the motor frame, the said pins not only limit the inward movement of the motor, but also serve to hold the same firmly down onto the tracks. To the power or crank shaft of the motor is fixed a flywheel 22 the periphery of which is beveled, as at 23.

A water cooler (designated in a general way by C) of the cellular type, extends transversely of the frame and is fixed to the side bars 1, 2 in the rear of the motor. A circulation of the water is maintained through a jacket around the motor and said cooler by means of suitable pipes or ducts 12, 13 connected to and leading from and to the motor and cooler, said pipes having automatic and flexible couplings therein 14, 15, which may be in the form of slip joints, so that when the motor is rolled into the chassis frame it will be automatically coupled up with the water cooler.

A shaft 16 is journaled in suitable journal boxes 17, 18 fixed to cross-bars 19, 20 secured at their ends to the side bars 1, 2 of the chassis frame. The said shaft extends through the water cooler with its axis in a plane parallel with the axis of the motor, and has fixed thereon a fan 21 in the rear of the water cooler to draw air through the cells of said cooler as the fan is rotated.

A beveled or cone wheel 24, to have frictional contact with the bevel on the flywheel 22, is mounted on the fan-shaft 16 in front of the water cooler, said wheel rotating with the fan shaft and having longitudinal sliding movement thereon. The inclination of the bevel on the wheel 24 is opposite to the inclination of the bevel 23 on the fly wheel. To permit of the wheel 24 to slide along the fan-shaft, said shaft is provided with a spline or key 25 engaging in a key-way in the hub of the wheel. The wheel is maintained in frictional contact with the fly wheel by means of a tension spring 26 coiled about the fan shaft and confined between the hub of the wheel and a washer 27 abutting against a cotter pin 28 fixed in the fan shaft. The frictional contacting surfaces of the wheel 24 and the bevel 23 on the fly-wheel may be provided with a suitable friction material.

As already stated the motor is adapted to be pushed into and drawn out from the front of the chassis frame. When the motor is drawn out the fly-wheel will readily pull away from the wheel 24, and when the motor is again placed in the frame the fan will be automatically coupled in operative relation with the fly-wheel of the motor by the bevel 23 abutting against the cone wheel.

Variations may be resorted to within the scope of my invention.

Having thus described my invention, I claim:

1. In a motor vehicle, the combination of a motor having a fly wheel connected thereto and adapted to be placed in position in the vehicle from the front thereof; a rotary fan; and a drive wheel connected to the fan with which the fly wheel is thrown into operative engagement as the motor is placed in position in the vehicle frame whereby to drive said wheel and fan from the fly wheel.

2. In a motor vehicle, the combination of a motor having a fly wheel connected thereto and adapted to be placed in position in the vehicle frame from the front thereof; a rotary fan; and a friction drive wheel connected to the fan with which the fly wheel is thrown into frictional engagement as the motor is placed in position in the vehicle frame, whereby to frictionally drive said wheel and fan from the fly wheel.

3. In a motor vehicle, the combination with a motor adapted to be placed in position in the vehicle frame from the front thereof, of a fly wheel fixed to the shaft of said motor; a rotary fan; a shaft on which said fan is fixed; and a friction drive wheel mounted on the fan shaft with which the fly wheel is thrown into frictional engagement as the motor is placed in the vehicle frame to frictionally drive said wheel and fan from the fly wheel.

4. In a motor vehicle, the combination with a motor adapted to be placed in position in the vehicle frame from the front thereof, of a fly wheel fixed to the shaft of said motor; a rotary fan; a shaft upon which said fan is fixed; a friction drive wheel mounted on the fan shaft to rotate therewith and have sliding movement thereon, and with which the fly wheel is thrown into frictional engagement as the motor is placed in the frame to automatically couple said wheels, whereby to frictionally drive said wheel and fan from the fly wheel; and means to maintain the friction drive wheel in frictional engagement with the fly wheel.

5. In a motor vehicle, the combination with a motor adapted to be placed in position in the vehicle frame from the front thereof, of a fly wheel fixed to the shaft of said motor; a water cooler fixed to the frame in the rear of the motor and with which the motor is automatically coupled as it is placed in the frame; a rotatable shaft passing through said cooler with its axis parallel with the axis of the motor; a fan fixed to said shaft in the rear of the cooler; a friction drive wheel mounted on said shaft to rotate therewith and have sliding movement thereon, and with which the fly wheel is automatically coupled as the motor is placed in the frame, whereby to frictionally drive said wheel and fan from the fly wheel; and a spring to maintain the friction drive wheel in frictional engagement with the fly wheel.

6. In a motor vehicle, the combination with the frame thereof, of a motor adapted to slide in and out of said frame and extending longitudinally thereof, said motor provided with a fly-wheel the periphery of which is beveled; a water cooler mounted on the frame in the rear of the motor; a shaft rotatively mounted in the frame and extending through the water cooler; a fan fixed to said shaft in the rear of the water cooler; a cone-wheel mounted on the fan shaft to rotate therewith and have sliding movement along the same, said wheel frictionally engaging with the bevel on the periphery of the fly-wheel whereby to drive the fan; and means to maintain said wheel in frictional contact with the bevel on the fly-wheel.

7. In a motor vehicle, the combination with the frame thereof, of a motor adapted to slide in and out of said frame and extending longitudinally thereof, said motor provided with a fly-wheel the periphery of which is beveled; a water cooler mounted on the frame in the rear of the motor; a shaft extending through said cooler the axis of which shaft is in a plane parallel with the axis of the motor; a pair of cross bars by which said shaft is rotatively supported; a fan fixed to said shaft in the rear of the water cooler; a cone-wheel mounted on the said shaft in front of the cooler to rotate therewith and having sliding movement along the same, the inclination of the bevel of said wheel being opposite to the inclination of the bevel on the fly-wheel and adapted to frictionally engage with the fly-wheel when the motor is slid into the frame; and a spring to maintain the cone wheel in frictional engagement with the fly-wheel; said spring coiled about the fan shaft and confined between the hub of the cone-wheel and a washer held in place by a cotter pin fixed in said shaft.

WILLARD IRVING TWOMBLY.

Witnesses:
JOHN O. SEIFERT,
PAULA PHILIPP.